L. ROUANET.
GAGING APPARATUS FOR BALL AND ROLLER BEARINGS.
APPLICATION FILED SEPT. 5, 1918.

1,317,459.

Patented Sept. 30, 1919.

INVENTOR:
Louis Rouanet
By Wm Wallace White
ATTY.

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE.

GAGING APPARATUS FOR BALL AND ROLLER BEARINGS.

1,317,459.  Specification of Letters Patent.  Patented Sept. 30, 1919.

Application filed September 5, 1918. Serial No. 252,701.

*To all whom it may concern:*

Be it known that I, LOUIS ROUANET, a citizen of the Republic of France, residing at 39 Rue Franklin, Ivry-Port, Seine, in the Republic of France, have invented new and useful Improvements in Gaging Apparatus for Ball and Roller Bearings, of which the following is a specification.

This invention relates to an improved gaging apparatus by means of which the different verifying operations required in the inspection of outer rings for ball or roller bearings can be made in one setting. As is well known, the measurements made on such pieces must be very accurate and said pieces being manufactured as a rule in big quantities it is very desirable to provide an apparatus by means of which said measurements can be made not only with a high precision but also very rapidly. This result is obtained with the apparatus constructed in accordance with the present invention which comprises in combination a device for measuring the inside diameter of the rolling way of the ring and two micrometers mounted on the same base as the said device and having fingers which are adapted to bear respectively against the outer periphery of the ring and one end face of the same.

In the accompanying drawing showing by way of example a gaging apparatus constructed in accordance with the invention:

Figure 1:
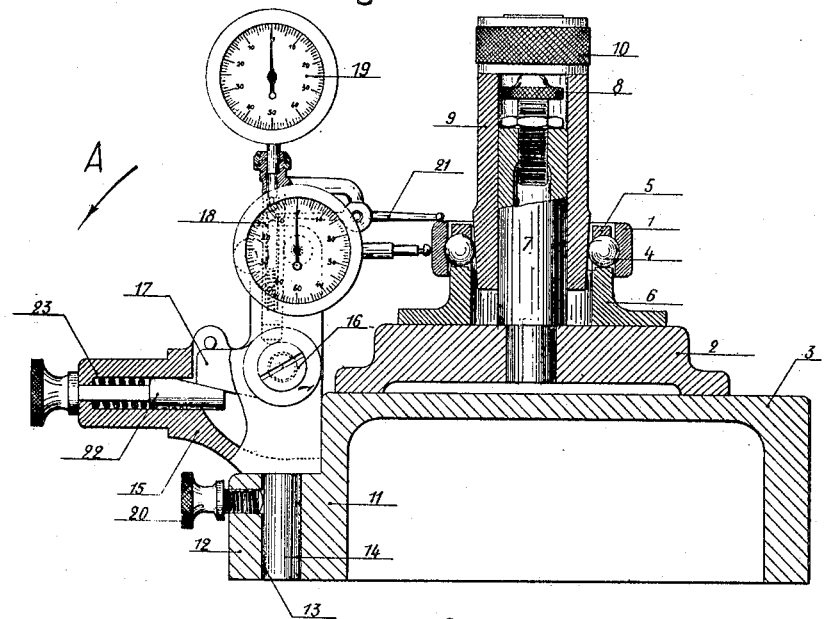
Figure 1 is a vertical section of the same, partly in elevation.
Figure 2:
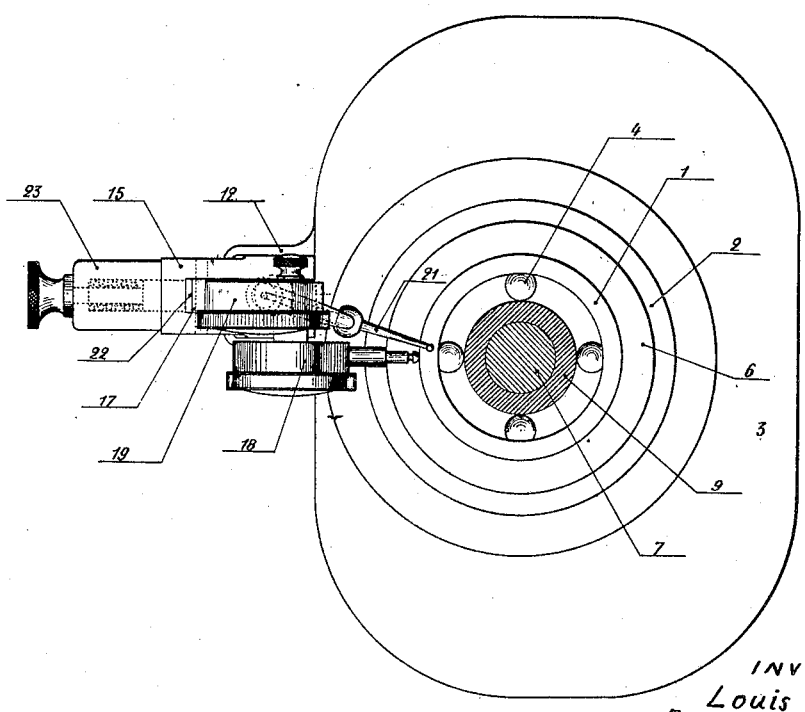
Fig. 2 is a corresponding plan view, partly in horizontal section.

As shown in the drawing, the apparatus comprises a base frame 3 upon which is mounted the base 2 of the verifying device for the inside diameter of the ring rolling way. The base 2 is secured on the main base 3 by any suitable means permitting the base 2 to be displaced on the base 3 to suit the dimensions of the rings to be inspected. The base 2 carries an annular bracket 6 provided with a horizontal annular surface upon which tactile bodies formed by walls 4 are adapted to rest. The ring 1 to be inspected is placed about said balls which bear against the inner surface of the rolling way provided in the ring. The balls 4 are mounted in supports 5 (Fig. 1) carried by the sleeve 6, the detailed construction of which is described in the U. S. application No. 217,684. Upon the base 2, is secured a central cylindrical rod 7 which carries at its upper end an adjustable contact member 8. On the rod 7, is guided a verifying member formed by a sleeve 9 provided at its bottom end with a conical part which bears against the balls 4 and tends to move them apart into contact with the surface of the rolling way of the ring. In operation, a checking block 10 is placed upon the respective top ends of the verifying member 9 and contact member 8 and the operator ascertains whether the diameter of the raceway in the ring is within the prescribed limits by feeling with his hand whether the checking block bears steadily upon the ends of the verifying and the contact members or may slightly tilt upon the same. The detailed construction of the checking block and the mode of operation of the same have been fully described in the above mentioned patent application.

The main base 3 is provided with an extension 12 having a bore 13 which receives the cylindrical extension 14 of a yoke member 15 provided with a horizontal stud shaft 16 upon which is pivoted a swinging lever or support 17 upon which two dial micrometers 18 and 19 are mounted. By moving the cylindrical part 14 within the bore 13, the position of the yoke 15 may be adjusted vertically, said yoke being clamped in any desired position by means of a set screw 20.

The micrometer 18 is rigidly supported on the lever 17 and its contact finger is adapted to bear against the outer periphery of the ring to be inspected.

The micrometer 19 may be moved vertically on the support 17 according to the height or thickness of the rings to be checked and the pivoted contact finger of the same is adapted to bear upon the upper end face of the ring.

In a cylindrical extension 23 of the yoke 15, is mounted a spring actuated plunger 22 which forms an abutment for the supporting lever 17 when the latter is in its working position. By pulling out said plunger 22, the support 17 may be tilted sideward so that a new ring to be tested may be conveniently placed about the balls 4.

The described apparatus is used as follows: The plunger 22 being withdrawn, the supporting lever 17 is swung laterally in the direction of arrow A, Fig. 1, to its inoperative position and a standard ring is placed around the balls 4, said ring centering itself automatically on said balls. The sleeve 9 is then introduced and the contact member 8 is adjusted so that its upper end is flush with the upper end of the sleeve or verifying member 9. The supporting lever 17 is then brought to its working position in which it is held by a stop pin provided on the yoke 15 and the latter is adjusted in height so that the contact finger of the micrometer 18 comes into contact with the outer periphery of the standard ring substantially in the middle of the height of the same. The micrometer 18 is then set to zero. The micrometer 19 is then adjusted vertically upon the supporting lever 17 so that its contact finger 21 comes into contact with the upper face of the ring and the said micrometer is set to zero. The apparatus is then ready for operation.

The standard ring is removed and the ball or roller bearing rings to be tested are successively placed on the balls 4. For each of those rings, the following verifying operations will then be made at one setting: by means of the checking block 10 it will be ascertained whether the diameter of the race is within the prescribed limits so that a first operation will be made, i. e.

(a) gaging the diameter of the rolling way.

The micrometer 18 will show the discrepancy between the actual outside diameter of the ring and the normal value of the same, which results in the following operation:

(b) gaging the outer diameter of the ring.

By rotating the ring by means of the sleeve 9 and through the medium of the balls 4, the micrometer 18 will also show the eccentricity of the rolling way with respect to the outside surface of the ring. The following operation will thus be performed:

(c) gaging the concentricity of the rolling way with respect to the outer periphery of the ring.

The micrometer 19 will show the difference between the actual width of the ring and the normal, which gives the following operation.

(d) gaging the width or thickness of the ring.

By rotating the ring through the sleeve 9, the micrometer 19 will permit to ascertain whether the upper surface of the ring is a true plane surface, which gives the following operation:

(e) checking the distortion of the ring.

Finally, if the ring is turned upside down so that its opposite end face comes into contact with the contact finger 21 of the micrometer 19, by comparison with the preceding reading on the said micrometer, the following operation will be performed:

(f) checking the distance between the median plane of the rolling way and the median plane of the ring.

Obviously in practice, the different verifying operations above described will be performed very quickly the inspector keeping his eyes on the two dials while the various manipulations are effected.

It will also be seen that the apparatus may easily be arranged for the inspection of the outer rings for roller bearings.

What I claim is:

1. A gaging apparatus for rings having an inner groove comprising in combination tactile bodies adapted to center and support the ring by bearing in its groove, a base for supporting said tactile bodies, an adjustable contact member carried by said base, a movable verifying member adapted to maintain the tactile bodies in contact with the ring to be tested, a checking block, a micrometer, the contact finger of which is adapted to bear against the outer periphery of the ring, a micrometer the contact finger of which is adapted to bear against one end surface of the ring, said micrometers being carried by the above mentioned base and means for adjusting the micrometers vertically.

2. A gaging apparatus for rings having an inner groove, comprising in combination tactile bodies adapted to center and support the ring by bearing in its groove, a base for supporting said tactile bodies, an adjustable contact member carried by said base, a movable verifying member adapted to maintain the tactile bodies in contact with the ring to be tested, a checking block, a supporting member; vertically adjustable on the above mentioned base, a swinging lever mounted on said member, a micrometer the contact finger of which is adapted to bear on the outer periphery of the ring to be tested, said micrometer being rigidly mounted on the said lever, a micrometer the contact finger of which is adapted to bear against one end face of the ring, means for adjusting vertically said micrometer on the lever and means for holding said lever in its working position.

In testimony whereof I have signed my name to this specification in the presence of two subscribing witnesses.

LOUIS ROUANET.

Witnesses:
ANTOINE LAVOIC,
JOHN F. SIMONS.

Copies of this patent may be obtained for five cents each, by addressing the "Commissioner of Patents, Washington, D. C."